Dec. 8, 1925.
G. H. GIBSON
1,564,553
COMBUSTION REGULATION
Filed Feb. 25, 1921
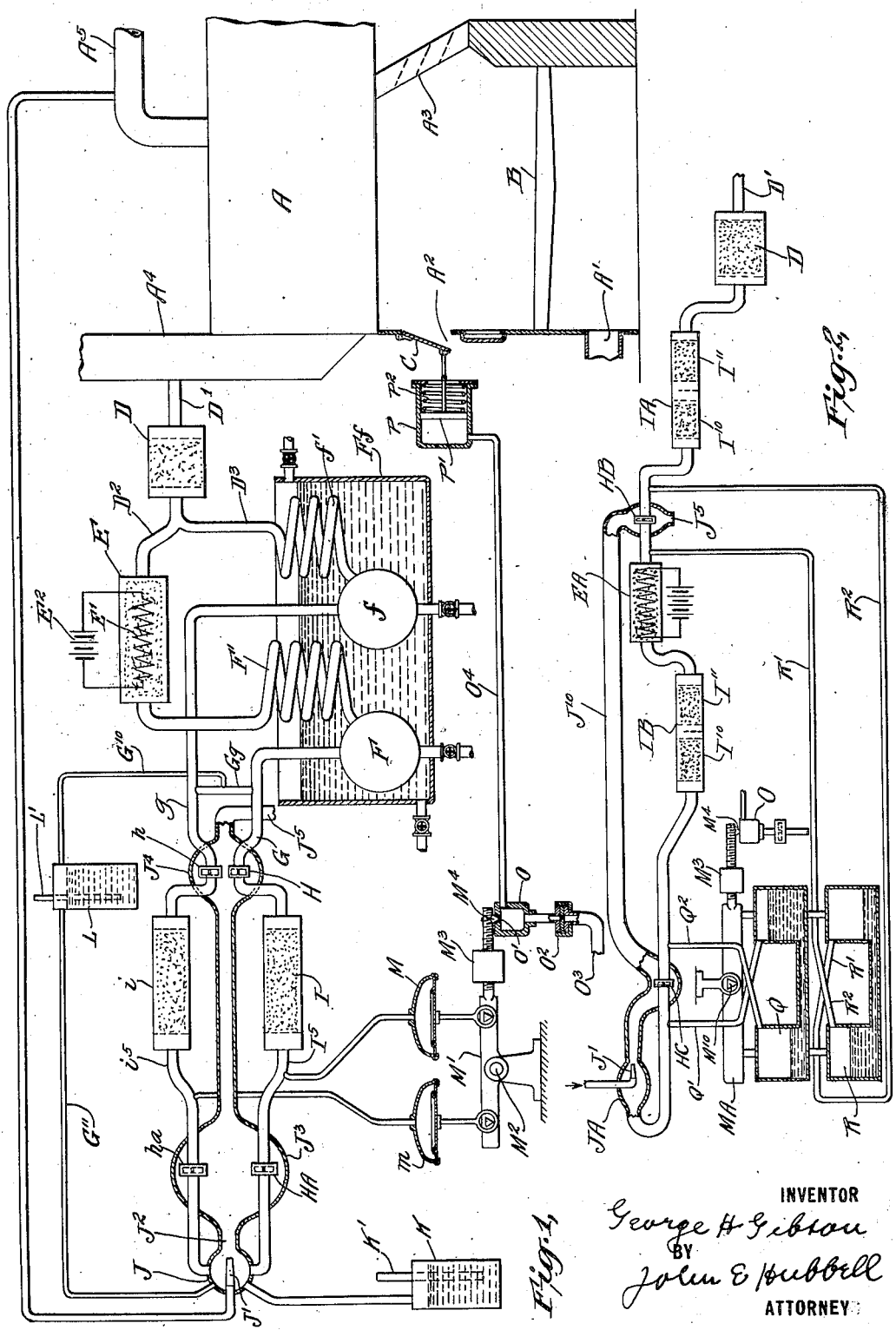
INVENTOR
George H. Gibson
BY
John E. Hubbell
ATTORNEY Patented Dec. 8, 1925.

1,564,553

UNITED STATES PATENT OFFICE.

GEORGE H. GIBSON, OF MONTCLAIR, NEW JERSEY.

COMBUSTION REGULATION.

Application filed February 25, 1921. Serial No. 447,904.

*To all whom it may concern:*

Be it known that I, GEORGE H. GIBSON, citizen of the United States, and resident of Montclair, in the county of Essex and State of New Jersey, have invented certain new and useful Improvements in Combustion Regulation, of which the following is a specification.

The general object of my present invention is to provide effective means responsive to the composition of the flue gases for automatically regulating combustion conditions in a boiler or analogous furnaces so as to minimize the excess air supplied on the one hand, and on the other hand, to minimize the unburnt combustible constituents of the flue gases.

In the combustion of fuel in a boiler or analogous furnace, the ideal condition would be one in which all of the oxygen is burnt out of the air supplied to support combustion, and in which all of the combustible constituents of the fuel would be completely oxidized. This perfect combustion would give, with anthracite coal as a fuel, something like 21% of $CO_2$ in the flue gases. In practice this ideal condition cannot be obtained. This is particularly true of furnaces burning solid fuel. The practical impossibility of maintaining ideal fuel bed conditions at all times, and of always effecting a perfect mixture of the secondary air with the combustible gases rising from the fuel bed while these gases are at an ignition temperature, makes it necessary to supply excess air; that is, air in excess of the amount theoretically required for the complete oxidation of all the combustible constituents of the fuel if all such combustible constituents are to be completely burned. The furnace efficiency is lowered more by an appreciable percentage of unburnt combustible constituents in the flue gases than by the addition of the excess air required to effect substantially complete combustion.

In the practical operation of boiler and analogous furnaces, the best results are ordinarily obtained with a supply of air to support combustion in amount something like 50% in excess of that theoretically required. With this amount of excess air the $CO_2$ content of the flue gases is something like 14%. It is now common practice in well conducted boiler furnace plants to continuously analyze the flue gases and to regulate combustion conditions so as to tend to maintain a definite $CO_2$ content of something like 14% in the flue gases, and I have devised means which are disclosed and claimed in my prior application, Serial No. 202,478, filed November 17, 1917, for controlling combustion conditions in response to the chemical composition of the flue gases so as to automatically maintain a predetermined $CO_2$ percentage in the flue gases. The maintenance of a constant $CO_2$ content in the flue gases will, in general, give better operating results than have heretofore been otherwise attainable in practice. Still better results can be obtained, however, by supplying just enough excess air at all times to thoroughly burn all of the combustible gases rising from the fuel bed. I thus insure sufficient air for complete combustion at times when, because of faulty fuel bed condition or lowered furnace temperatures, more than the normal amount of excess air is required for complete combustion, and when the combustion conditions approach the practical ideal for the furnace, the excess air is reduced, and the $CO_2$ content in the flue gases will then be appreciably higher than the content which can be maintained as a constant without occasional substantial reductions in the thermal efficiency of the furnace because of incomplete combustion.

In carrying out my invention I provide means responsive to the presence of combustible constituents in the flue gases for varying the ratio of fuel burnt to the air supplied to the furnace for the combustion of the fuel as required to avoid any appreciable amount of unconsumed combustible constituents in the flue gases.

The various features of novelty which characterize my invention are pointed out with particularity in the claims annexed to and forming a part of this specification. For a better understanding of the invention, however, its advantages and specific objects attained with it, reference should be had to the accompanying drawings and descriptive matter in which I have illustrated and described some of the many forms of apparatus in which my invention may be embodied.

Of the drawings:

Fig. 1 is a diagrammatic representation of a furnace provided with one form of my improved regulating apparatus; and Fig. 2 is a diagrammatic representation of a modified form of apparatus.

In the embodiment of my invention shown diagrammatically and by way of example in Fig. 1 of the drawings, A represents a boiler furnace of the return tubular type. The boiler A is provided with a primary air inlet A', a fuel bed supporting grate B, a secondary air inlet A² controlled by a damper C, a pervious gas mixing baffle A³ above the furnace bridge wall, a flue gas outlet or stack connection A⁴, and a steam pipe A⁵. The amount of excess air supplied is regulated in automatic response to the chemical composition of the flue gases by the provisions made for automatically adjusting the secondary air inlet damper C.

The provisions shown in Fig. 1 for this purpose comprise means for continuously withdrawing from the stack connection A⁴ a flue gas sample and for dividing this sample into two parts and for subjecting one part to conditions which will thoroughly oxidize any combustible constituents therein and for separately absorbing the $CO_2$ content from both portions of the flue gas sample and for automatically adjusting the damper C in response to variations in the relative amounts of $CO_2$ absorbed from the two portions of the flue gas sample in such fashion as to tend to maintain the same $CO_2$ absorption in the two portions of the flue gas sample.

The means shown for carrying out the operations mentioned in the preceding paragraph, comprise a flue gas sample outlet D' leading to a dust filter D. The outlet from the filter D is divided into two branches D² and D³. The branch D² leads to a chamber E for completely oxidizing therein any combustible constituents of the portion of the flue gas sample passed to the chamber. The oxidizing chamber E, as shown, is heated by an electric heating resistance E' supplied with current from a battery or other source E², and contains some suitable oxidizing agent such as copper oxide. From the oxidizing chamber E, the unabsorbed gaseous residue is passed to a $CO_2$ absorber I. The gas which leaves the filter chamber D through the outlet branch D³ is passed to a similar $CO_2$ absorber $i$. The $CO_2$ absorber may be of the usual form employed in $CO_2$ analyzers. As diagrammatically shown, each comprises a chamber containing a porous mass of $NaOH$ or analogous material. As shown provisions are made for condensing water vapor out of the gas portions passing to the two $CO_2$ absorbers I and $i$. These provisions comprise coils F' and $f'$ leading to chambers F and $f$, respectively, which, with the coils F' and $f'$ are located in a receptacle $Ff$ containing a cooling liquid.

The conduits G and $g$ connecting the vessels F and $f$ to the absorbers I and $i$, respectively, are provided with measuring orifices H and $h$ respectively. The outlets from the absorbers I and $i$ are connected by separate conduits $I^5$ and $i^5$, respectively, to an exhauster J. The conduit $I^5$ is provided with a measuring orifice HA and the conduit $i^5$ is provided with a similar orifice $ha$.

The exhauster J comprises a chamber with a discharge throat $J^2$ and a nozzle J' supplied with steam from the boiler steam pipe $A^5$ or any suitable source. Advantageously the discharge from the chamber J is passed through a chamber $J^3$, and then through a chamber $J^4$ before being discharged to the atmosphere at $J^5$. The measuring orifices HA and $ha$ are located in the chamber $J^3$ and the orifices H and $h$ are located in the chamber $J^4$. The stream of steam and gas passing through the chambers $J^3$ and J tends to keep all of the orifices Ha, ha, H and $h$ at the same temperature, as is desirable to insure the proper relation between flows and pressure drops through the orifices. To equalize the pressures at the inlet sides of the measuring orifices H and $h$, a cross connection $Gg$ is made between the pipes G and $g$, and this connection is connected to the exhaust chamber J by pipes $G^{10}$ and $G^{11}$ and a vacuum regulator chamber L. The latter contains water or other sealing liquid, and has a dip pipe L' open at its upper end and extending through the otherwise closed top wall of the chamber L. With this arrangement the vacuum or minus pressure in the chamber L will correspond to the depth which the dip pipe L' extends into the sealing liquid. Advantageously the vacuum or minus pressure in the chamber J is similarly controlled by a vacuum regulator K having a dip pipe K'. It will be understood, of course, that since the vacuum maintained in the chamber K is greater than that maintained in the chamber L, the pipe $G^{11}$ should offer greater resistance to flow through it than does the pipe connecting the chambers K and J.

The damper C is adjusted in response to variations in the relative pressures in the conduits $I^5$ and $i^5$. For this purpose I provide a differential pressure apparatus comprising two pressure chambers M and $m$ to which the pipes $I^5$ and $i^5$ are respectively connected. The flexible walls of the pressure chambers M and $m$ are pivotally connected to a lever M' at opposite sides of its pivot $M^2$. The lever $M'$ carries at one end a valve $M^4$ which throttles the outlet part $O'$ of a chamber O. The chamber O is connected to a source of fluid, which may be compressed air but is advantageously water under pressure, by a conduit $O^3$ containing a restricted orifice $O^2$. The chamber O is connected by a pipe $O^4$ to the chamber P of a fluid pressure motor. The piston $P'$ working in the chamber P is directly connected to the damper C in such manner that as the pressure builds up in the chamber P, the damper C is closed. A spring $P^2$ acts against the piston $P'$ in a direction tending to open the damper C.

With the described arrangement when the pressure in the conduit $I^5$ falls, relative to the pressure in the conduit $i^5$, the valve $M^4$ opens somewhat thus increasing the leakage out of the chamber O through the port $O'$ and thereby lowering the pressure in the chamber O. Conversely when the pressure in the conduit $I^5$ rises relative to that in the conduit $i^5$, the valve $M^4$ moves in the closing direction and restricts leakage through the port $O'$ and thereby increases the pressure in the chamber O. The damper C closes and opens accordingly as the pressure in the chamber O and hence in the chamber P rises and falls. Advantageously the lever $M'$ is provided with an adjustable weight $M^3$ by which the operation of the apparatus may be adjusted.

The general operation of the apparatus shown in Fig. 1 will be apparent to those skilled in the art without further explanation. When there is no combustible constituent in the flue gas passing through the oxidizing chamber E, the only effect of that chamber is to raise the temperature of the gas. The passage of the two portions of the gas sample through the condensing coils and condensing chambers $F'$ $f'$, F and $f$, and the provisions made for bringing the measuring orifices H and $h$ to the same temperature insure an equilibrium in temperature of the two portions of the gas sample passing through these orifices. The equalizing connections G$g$ and its connection to the exhaust chamber J insures an equilibrium in pressure at the inlet sides of the two orifices H and $h$ without any cross flow between the conduits G and $g$ when the parts are properly proportioned and operated.

If the two portions of the gas sample contain the same amount of $CO_2$ the same pressures will exist in the conduits $I^5$ and $i^5$, but if the portion of the gas sample passing through the chamber E contains combustible gas the $CO_2$ content of this portion will be increased in the chamber E, and the $CO_2$ absorption in the chamber I will be relatively greater than the $CO_2$ absorption in the chamber $i$. This will make the pressure in the conduit $I^5$ less than in the conduit $i^5$. The effect of a variation in one direction or the other in the relative pressures in the conduits $I^5$ and $i^5$ will be, as already explained, to open or close the valve $M^4$ somewhat and thus correspondingly adjust the damper C. Opening the damper C admits more secondary air to the furnace chamber and thus tends to reduce the combustible constituent in the flue gases. The apparatus shown in Fig. 1 when sufficiently sensitive and properly calibrated, thus operates to maintain a supply of air to the furnace just sufficient to insure complete combustion.

In the modified form of apparatus shown in Fig. 2 the gas sample withdrawn from the stack outlet through the conduit $D'$ and filter D, is passed successively through an absorber IA, a measuring orifice HB, an oxidizing chamber EA, an absorber IB, and a measuring orifice HC into a vacuum creating device JA which may be similar to the device J first described. The measuring orifices HB and HC are both maintained at practically the same temperature by locating them in the ejector discharge pipe $J^{10}$. The absorber IA comprises a $CO_2$ absorbing section $I^{10}$ and the dehydrating section $I^{11}$. The latter may consist of a porous mass of calcium chloride or the like. The section $I^{10}$ may consist of a porous mass of NaOH or the like. The absorber IB may be identical in construction with the absorber IA. The oxidizing chamber E may be the same as that shown in Fig. 1. The pressures at opposite sides of the orifice HB are transmitted to the opposite legs of a U-tube R by flexible conduits $R'$ and $R^2$, and the pressures at opposite sides of the orifice HC are transmitted by flexible conduits $Q'$ and $Q^2$ to the opposite legs of a U-tube Q. The U-tubes Q and R, each of which contains a sealing liquid, are suspended from a lever MA pivoted at $M^{10}$, and provided with an adjusting weight $M^3$ and a valve member $M^4$. As in the construction first described the valve member $M^4$ of Fig. 2 may control the outlet $O'$ from a chamber O and thereby regulate the supply of secondary air to the furnace with which the apparatus is employed.

With the arrangement shown in Fig. 2, the pressure drop throughout the orifice HB will increase or diminish relative to the pressure drop through the orifice HC accordingly as the percentage of $CO_2$ and $H_2O$ absorbed in the absorber IB increases or diminishes. When the pressure drop through the orifice HB increases relatively to the pressure drop through the orifice HC, the change in the relative distribution of the sealing liquids in the U-tubes Q and R tends to open the valve $M^4$ and thus increases the amount of excess air supplied to the furnace, and conversely when the pressure drop through the orifice HB decreases relative to the pressure drop through the orifice HC, the valve member M⁴ is moved in the closing direction and thus decreases the amount of secondary air supplied to the furnace. The apparatus shown in Fig. 2 thus operates just as does the apparatus shown in Fig. 1 to supply excess air in amount just sufficient to completely burn all the combustible constituents of the gases rising from the furnace fuel bed.

In the construction of Fig. 2 as in that of Fig. 1 the regulation depends upon the amount of oxidation occurring when the combustible constituents in the flue gas sample is subjected to a treatment which will result in their complete oxidation, and in each of these embodiments of my invention the ratio of the fuel burnt in the furnace to the air supplied for the combustion of the fuel is automatically decreased or increased upon an increase or decrease in the amount of combustible constituents oxidized.

In the construction shown in Fig. 1 the regulation is in response to the amount of $CO_2$ formed by the oxidizing action, while the arrangement shown in Fig. 2, the regulation is responsive to the aggregate amounts of $CO_2$ and $H_2O$ formed by the oxidizing action. With ordinary solid fuels the amount of $CO_2$ is always relatively large with respect to the amount of $H_2O$ formed by the oxidizing action, and in such case the operation of the two forms of apparatus illustrated do not differ essentially because the amount of $H_2O$ produced by the oxidizing action in Fig. 2 does, and in Fig. 1, does not affect the operation of the regulating apparatus. Where the fuel comprises a relatively large amount of hydrogen the type apparatus shown in Fig. 2 should be used in preference to that shown in Fig. 1.

While in accordance with the provisions of the statutes, I have illustrated and described the best embodiments of my invention now known to me, it will be apparent to those skilled in the art that changes may be made in the form of my invention as set forth in the appended claims without departing from its spirit, and that certain features of my invention may sometimes be used to advantage without a corresponding use of other features.

Having now described my invention, what I claim as new and desire to secure by Letters Patent, is:

1. The combination with a furnace of means responsive to the presence of combustible constituents in the gaseous products of combustion leaving the furnace for automatically regulating the ratio between the rate at which fuel is actually burned in the furnace and the rate at which air is supplied thereto for the combustion of the fuel.

2. The combination with a furnace of means responsive to the presence of combustible constituents in the gaseous products leaving the furnace for automatically decreasing the ratio between the rate at which fuel is actually burned in the furnace and the rate at which air is supplied for its combustion on an increase in the relative amount of said combustible constituents in said products.

3. Apparatus for regulating combustion in a furnace comprising means for continuously subjecting a portion of the gaseous products leaving the furnace to an oxidizing action, means for eliminating from said portion the $CO_2$ thereby produced and means regulating the ratio between the rate at which fuel is actually burned in the furnace and the rate at which air is supplied for its combustion and in automatic response to the quantity change in said gas portion resulting from said elimination of $CO_2$.

4. Apparatus for regulating combustion in a furnace comprising means for oxidizing combustible constituents of the gaseous products of combustion from the furnace and means responsive to the amount of oxidation produced for automatically decreasing the ratio between the rate at which fuel is actually burned in the furnace and the rate at which air is supplied for its combustion, as the amount of said oxidation increases.

5. Apparatus for regulating combustion in a furnace comprising in combination means tending to maintain the ratio between the rate at which fuel is actually burned in the furnace and the rate at which air is supplied for its combustion in excess of that at which complete combustion occurs and means automatically responsive to the presence of combustible constituents in the products of combustion leaving the furnace for decreasing said ratio as required to keep the amount of said constituents small.

6. In a furnace having a fuel bed and primary and secondary air supplies the combination therewith of means automatically increasing and diminishing the air supplied as the amount of combustible constituents in the products of combustion leaving the furnace increases and diminishes.

7. Apparatus for regulating combustion in a furnace comprising means for subjecting gaseous products of combustion from the furnace to an oxidizing action, means for eliminating the portion of said products oxidized by said action, and means responsive to the amount of oxidized products thus eliminated for decreasing the ratio between the rate at which fuel is actually burned in the furnace and the rate at which air is supplied for its combustion in accordance with the amount of oxidized products eliminated.

8. Apparatus for regulating combustion in a furnace comprising in combination means of dehydrating and eliminating $CO_2$ from a portion of the flue gases leaving the furnace, means for subjecting the dehydrated and $CO_2$ freed products to the action of heat in the presence of an oxidizing agent, means for dehydrating and eliminating $CO_2$ from the products leaving the oxidizing means, and means automatically decreasing the ratio between the rate at which fuel is actually burned in the furnace and the rate at which air is supplied for its combustion in accordance with the quantity of water vapor and $CO_2$ eliminated from the products by the last previously mentioned means.

Signed at New York in the county of New York and State of New York this 19th day of February A. D. 1921.

GEORGE H. GIBSON.